United States Patent
Elliott (10) Patent No.: US 9,868,518 B2
(45) Date of Patent: Jan. 16, 2018

(54) LANDING GEAR ASSEMBLY

(71) Applicant: Airbus Operations Limited, Bristol (GB)

(72) Inventor: Nicholas Elliott, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 7 days.

(21) Appl. No.: 14/830,909

(22) Filed: Aug. 20, 2015

(65) Prior Publication Data
US 2016/0052623 A1 Feb. 25, 2016

(30) Foreign Application Priority Data
Aug. 22, 2014 (GB) .................................. 1414986.8

(51) Int. Cl.
| | | |
|---|---|---|
| B64C 25/14 | (2006.01) | |
| B64C 25/18 | (2006.01) | |
| B64C 25/22 | (2006.01) | |
| B64C 25/50 | (2006.01) | |
| B64C 25/34 | (2006.01) | |

(52) U.S. Cl.
CPC .............. B64C 25/18 (2013.01); B64C 25/14 (2013.01); B64C 25/22 (2013.01); B64C 25/34 (2013.01); B64C 25/50 (2013.01)

(58) Field of Classification Search
CPC ......... B64C 25/18; B64C 25/50; B64C 25/10; B64C 25/14; B64C 25/22; B64C 25/34; B64C 2025/0006
See application file for complete search history.

(56) References Cited

U.S. PATENT DOCUMENTS

| | | | |
|---|---|---|---|
| 2,353,167 A | 12/1950 | Smith et al. | |
| 2,535,167 A * | 12/1950 | Smith | B64C 25/50 180/438 |
| 2,645,882 A * | 7/1953 | Cook | A63H 27/02 446/31 |
| 2,835,142 A * | 5/1958 | Foster | B64C 25/22 254/93 VA |
| 4,228,975 A * | 10/1980 | Sealey | B64C 25/14 244/102 R |
| 8,840,063 B2 * | 9/2014 | Lieven | B64C 25/20 244/102 A |
| 2006/0049309 A1 | 3/2006 | Hershberger et al. | |

(Continued)

FOREIGN PATENT DOCUMENTS

| | | |
|---|---|---|
| EP | 1632431 A2 | 3/2005 |
| GB | 551262 A | 2/1943 |

OTHER PUBLICATIONS

Extended European Search Report issued in EP Application No. 15181943.0 mailed date Jan. 20, 2016.

*Primary Examiner* — Assres H Woldemaryam
(74) *Attorney, Agent, or Firm* — Hauptman Ham, LLP (57) ABSTRACT

The present invention provides a landing gear assembly for an aircraft landing gear, the assembly comprising a steering mechanism for steering at least one wheel of the landing gear, a deployment mechanism for moving a leg of the landing gear between a stowed position and a deployed position, and an actuator arranged to actuate both the steering mechanism and the deployment mechanism. The invention also provides an aircraft landing gear, an aircraft and methods of operating an aircraft landing gear.

21 Claims, 7 Drawing Sheets

(56) References Cited

U.S. PATENT DOCUMENTS

2012/0112000 A1* 5/2012 Moine .................... B64C 25/50
                                              244/102 A
2014/0157917 A1* 6/2014 Oestreich ................. B60S 9/08
                                              74/89.13

* cited by examiner

FIG. 7

LANDING GEAR ASSEMBLY

RELATED APPLICATIONS

The present application claims priority from Great Britain Application Number 1414986.8, filed Aug. 22, 2014, the disclosure if which is hereby incorporated by reference herein in its entirety.

BACKGROUND OF THE INVENTION

The present invention concerns a landing gear assembly for an aircraft landing gear. More particularly, but not exclusively, the present invention concerns a landing gear assembly comprising a steering mechanism for steering at least one wheel of the landing gear and a deployment mechanism for moving a leg of the landing gear between a stowed position and a deployed position. The invention also concerns an aircraft landing gear, an aircraft and methods of operating an aircraft landing gear.

A typical prior art aircraft nose landing gear comprises a steering mechanism for steering at least one wheel of the landing gear and a deployment mechanism for moving a leg of the landing gear between a stowed position and a deployed position. Each of the mechanisms has an actuator associated with it to actuate the mechanism. The steering actuator actuates the steering mechanism to steer the at least one wheel. The deployment actuator actuates the deployment mechanism, including a foldable drag stay, to deploy or stow the landing gear. The deployment mechanism also typically comprises an uplock link for preventing the drag stay from folding when the landing gear leg is in the deployed position. The uplock link functions as a two-part linkage with an over-centre hinge, to lock it in place. There is also typically an uplock actuator that moves the uplock out of a locking position when the leg is to be moved to the stowed position. A typical prior art aircraft nose landing gear also comprises a centreing cam arrangement. This centreing cam arrangement ensures that a wheel of the landing gear is centred—i.e. orientated in a straight direction (in an orientation so that the aircraft would not be steered left or right, off its course—i.e. when the wheel is substantially parallel to the aircraft centre line) when in a "weight off wheel" situation. This means that when the landing gear is deployed and the aircraft then lands, the aircraft is not accidentally steered off course.

There is a desire to make landing gears as light as possible to reduce fuel burn, whilst still providing the required functionality and safety. The prior art landing gears may be considered to be heavier than desired.

The present invention seeks to mitigate the above-mentioned problems. Alternatively or additionally, the present invention seeks to provide an improved landing gear assembly for an aircraft landing gear.

SUMMARY OF THE INVENTION

The present invention provides, according to a first aspect, a landing gear assembly for an aircraft landing gear, the assembly comprising a steering mechanism for steering at least one wheel of the landing gear, a deployment mechanism for moving a leg of the landing gear between a stowed position and a deployed position, and an actuator arranged to actuate both the steering mechanism and the deployment mechanism.

The inventor has realised that the same actuator could be used for actuating both the steering mechanism and the deployment mechanism. In particular, it is noted that, when the aircraft is to be steered by the landing gear (when it is in a "weight on wheel" situation), the landing gear is always deployed, and when the landing gear is stowed, or being moved to be stowed, (when it is in a "weight off wheel" situation) the aircraft does not need to be steered by the landing gear. Having one actuator (and associated systems and pipework) instead of two, reduces the weight of the landing gear assembly, and thus decreases fuel burn of the aircraft. It also reduces the maintenance burden and reduces the drag and noise generated by the landing gear assembly, when the landing gear leg is deployed.

The present invention provides a landing gear assembly for an aircraft landing gear, the assembly comprising a steering mechanism for steering at least one wheel of the landing gear, a deployment mechanism for moving a leg of the landing gear between a stowed position and a deployed position, and a single actuator arranged to actuate both the steering mechanism and the deployment mechanism.

The landing gear assembly is preferably for an aircraft nose landing gear.

Preferably, the landing gear assembly further comprises a coupling mechanism for coupling the actuator to the steering mechanism and the deployment mechanism, wherein the coupling mechanism is arranged to couple the actuator to only one of the steering mechanism and the deployment mechanism at any one time. This ensures that the actuator can be coupled to only the appropriate mechanism in each appropriate situation.

The coupling mechanism is arranged to couple the actuator to each respective mechanism such that the respective mechanism is able to be actuated by the actuator. The coupling mechanism may do this by connecting the respective mechanism to the actuator. However, preferably, the coupling mechanism does this by preventing the other mechanism from being actuated by the actuator.

Preferably, the coupling mechanism is arranged to automatically couple the actuator to only one of the steering mechanism and the deployment mechanism at any one time. The automatic coupling is preferably achieved by mechanical action of the coupling mechanism.

Preferably, the landing gear assembly further comprises a coupling mechanism for coupling the actuator to the steering mechanism and the deployment mechanism, wherein the coupling mechanism is arranged to automatically couple (preferably by a mechanical action of the coupling mechanism) the actuator to only one of the steering mechanism and the deployment mechanism at any one time.

More preferably, the coupling mechanism is arranged to couple the actuator to the steering mechanism when the wheel is in a "weight on wheel" situation and to couple the actuator to the deployment mechanism when the wheel is in a "weight off wheel" situation. This ensures that the steering mechanism can be actuated when it is needed and the deployment mechanism can be actuated when it is needed.

More preferably, the coupling mechanism is arranged to automatically couple the actuator to the steering mechanism when the wheel is in a "weight on wheel" situation and to automatically couple the actuator to the deployment mechanism when the wheel is in a "weight off wheel" situation. The automatic coupling is preferably achieved by mechanical action of the coupling mechanism.

A "weight on wheel" situation is one in which the at least one wheel would be touching the ground and supporting at least a first amount of the weight of the aircraft. A "weight off wheel" situation is one in which the at least one wheel would be supporting less than the first amount of weight of the aircraft and the wheel is often not touching the ground. The first amount may be very small and may be zero or close to zero.

The automatic coupling of the coupling mechanism is preferably achieved by a mechanical action of the coupling mechanism as a result of a change between a "weight on wheel" and a "weight off wheel" situation.

Even more preferably, the coupling mechanism comprises a locking mechanism, comprising a locking element moveable between a steering locked position, in which the steering mechanism is prevented from steering the wheel, and a steering unlocked position, in which the steering mechanism is able to steer the wheel, wherein when the wheel is in a "weight on wheel" situation the locking element is (automatically) moved to the steering unlocked position and when the wheel is in a "weight off wheel" situation, the locking element is (automatically) moved to the steering locked position. This allows the "switch" between the mechanisms by the coupling mechanism to be provided by the locking mechanism.

Even more preferably, the locking element (automatically) moves from the steering locked position to the steering unlocked position under the action of the wheel being moved from a dropped position to a raised position relative to the locking element when the wheel changes from a "weight off wheel" to a "weight on wheel" situation and (automatically) moves from the steering unlocked position to the steering locked position under the action of the wheel being moved from the raised position to the dropped position relative to the locking element when the wheel changes from a "weight on wheel" to a "weight off wheel" situation. This allows the "switch" between the mechanisms by the coupling mechanism to be "automatic", without user/pilot input being required.

The coupling mechanism may be arranged to convert linear motion of the actuator to rotational motion, in order to rotate a part of the steering mechanism.

Even more preferably, the coupling mechanism comprises a crank arm rotatable between first and second rotation positions by the actuator when the locking element is in the steering unlocked position, and prevented from rotating when the locking element is in the steering locked position. The crank arm being prevented from rotating provides that steering of the at least one wheel can be prevented.

Even more preferably, the crank arm is connected to the steering mechanism such that when the crank arm is in the first rotation position, the steering mechanism steers the wheel in a first direction and when the crank arm is in the second rotation position, the steering mechanism steers the wheel in a second different direction. This allows the rotation of the crank arm to enable steering of the at least one wheel.

Even more preferably, the crank arm is connected to the steering mechanism by a bevel gear arrangement such that rotational movement of the crank arm is converted to rotational movement of the steering mechanism.

Preferably, when in the steering locked position, the locking element acts on the bevel gear arrangement to prevent its rotation.

Additionally or alternatively, when in the steering locked position, the locking element acts on the steering mechanism to prevent its rotation.

The locking mechanism may comprise two or more locking elements; a first locking element may act on the bevel gear arrangement to prevent its rotation, and a second locking element may act on the steering mechanism to prevent its rotation.

Preferably, the locking element is part of a centring arrangement for centring the steering mechanism, such that the wheel is steered in a central direction (i.e. when the at least one wheel is centred—i.e. orientated in a straight direction (in an orientation so that the aircraft would not be steered left or right, off its course) when the wheel is in a "weight off wheel" situation. This means that when the landing gear is deployed and the aircraft then lands, the aircraft is not accidentally steered off course.

Preferably, the coupling mechanism comprises a lever arm connected at its first end to the actuator and moveable by the actuator between extended and retracted positions.

Even more preferably, the lever arm is rotatably connected at its second end to the crank arm such that when the lever arm is caused to extend and retract by the actuator, the crank arm is caused to rotate by the lever arm.

Even more preferably, when the crank arm is prevented from rotating by the locking element in the steering locked position, movement by the actuator of the lever arm between extended and retracted positions instead causes the landing gear leg to move between the deployed and stowed positions.

Preferably, the steering mechanism comprises a steering collar connected to the actuator and one or more torque links connected to the wheel.

Preferably, the deployment mechanism comprises a number of moveable links, including a lock link, connected between the actuator and the landing gear leg.

More preferably, the deployment mechanism further comprises a lock link actuator for moving the lock link.

According to a second aspect of the invention there is also provided an aircraft landing gear comprising the landing gear arrangement of the first aspect of the invention. The aircraft landing gear is preferably an aircraft nose landing gear.

According to a third aspect of the invention there is also provided an aircraft comprising the aircraft landing gear of the second aspect of the invention or the landing gear arrangement of the first aspect of the invention.

According to a fourth aspect of the invention there is also provided a method of operating an aircraft landing gear comprising the step of providing a landing gear arrangement, aircraft landing gear or aircraft of the first, second or third aspect of the invention.

According to a fifth aspect of the invention there is also provided a method of operating an aircraft landing gear comprising the steps of, in a first time period, placing a wheel of the landing gear on the ground such that the wheel is in a "weight on wheel" situation, thereby moving a steering locking element of the landing gear to a steering unlocked position (in which the steering mechanism is able to steer the wheel), and then using an actuator of the landing gear to steer the wheel, and, in a second time period, removing the wheel of the landing gear from the ground such that the wheel is in a "weight off wheel" situation, thereby moving the steering locking element to a steering locked position (in which the steering mechanism is prevented from steering the wheel), and then using the actuator to stow and/or deploy the landing gear.

According to a fifth aspect of the invention there is also provided a method of operating an aircraft landing gear comprising the steps of, in a first time period, placing a wheel of the landing gear on the ground such that the wheel is in a "weight on wheel" situation, thereby moving a steering locking element of the landing gear to a steering unlocked position (in which the steering mechanism is able to steer the wheel), and then using an actuator of the landing gear to steer the wheel, and, in a second time period, removing the wheel of the landing gear from the ground such that the wheel is in a "weight off wheel" situation, thereby moving the steering locking element to a steering locked position (in which the steering mechanism is prevented from steering the wheel), and then using the same actuator to stow and/or deploy the landing gear.

Preferably, the aircraft landing gear is an aircraft nose landing gear.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
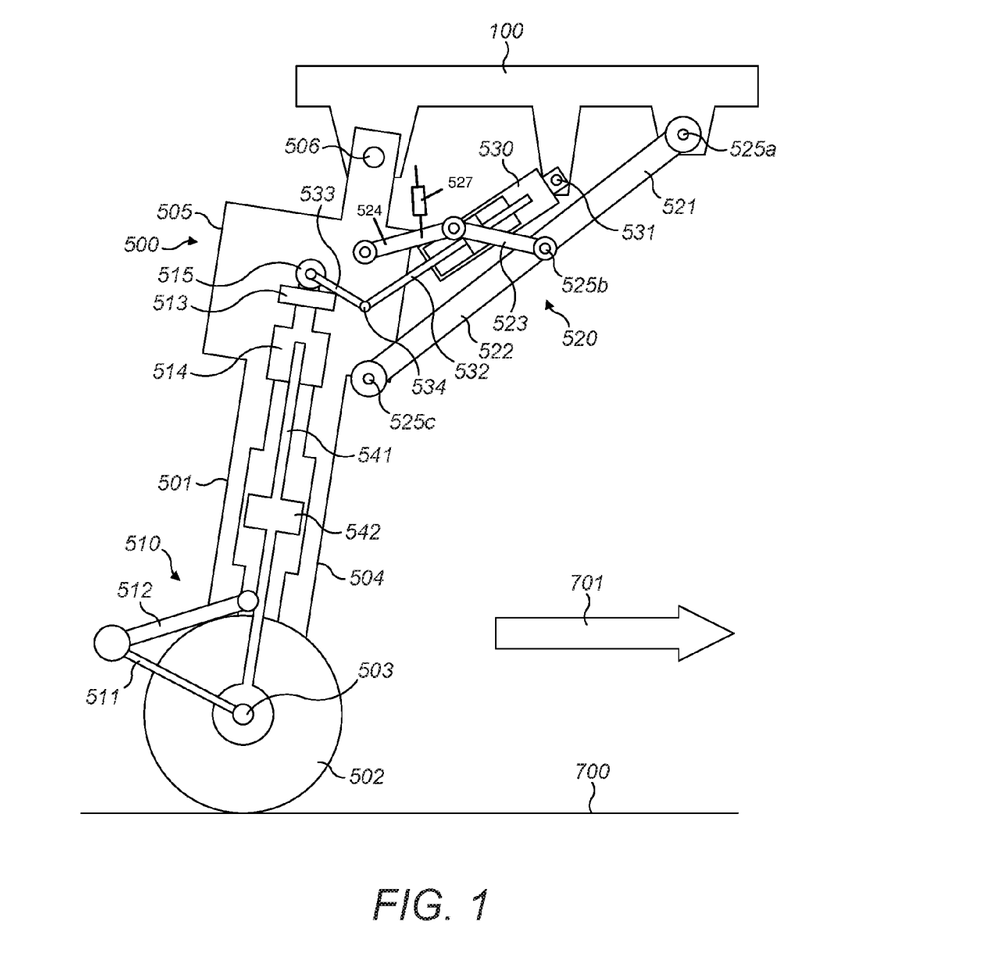
FIG. 1 shows a side view of an aircraft nose landing gear according to a first embodiment of the invention, in a deployed "weight on wheel" situation.
Figure 2:
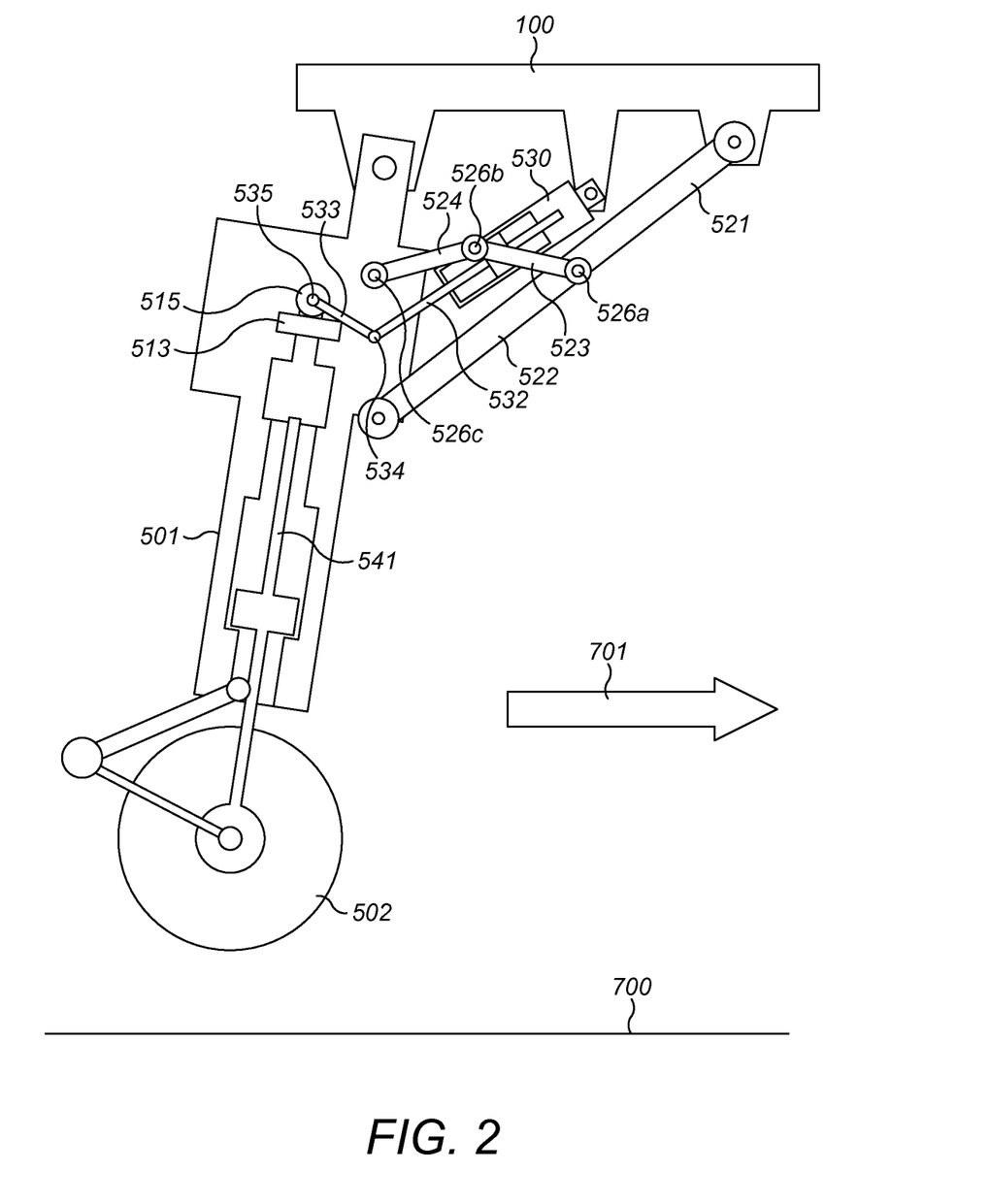
FIG. 2 shows a side view of the aircraft nose landing gear, in a deployed "weight off wheel" situation.

FIG. 1 shows a side view of an aircraft nose landing gear 500 according to a first embodiment of the invention, in a deployed "weight on wheel" situation and FIG. 2 shows a side view of the aircraft nose landing gear 500, in a deployed "weight off wheel" situation. The forwards direction 701 is shown. In addition, the ground surface 700 is also shown.

The landing gear 500 comprises a landing gear leg 501, which is suspended from a fuselage 100 of an aircraft by a pivot point 506.

In addition, an actuator 530 is also suspended from the fuselage 100 by a pivot point 531 behind the leg pivot point 506. The actuator 530 itself will be explained in more detail in relation to FIGS. 4a to 4c. The actuator 530 is attached to the landing gear leg 501, by a lever arm 532 (acting as an actuator rod), pivotally connected at pivot point 534 to a crank arm 533. The crank arm 533 is pivotally connected to a bevel gear 515 located in the upper portion 505 of the landing gear leg 501.

In the "weight on wheel" situation of FIG. 1, the bevel gear 515 is located adjacent a steering disc 513 of a steering mechanism 510. The steering disc 513 connected to a steering column 514. The steering column 514 is rotatably housed in the landing gear leg 501. Hence, pivotal movement of the crank arm 533 causes rotation of the bevel gear 515 which causes rotation of the steering disc 513 and steering column 514. The steering column 514 is connected to a first torque link 512 at a lower portion 504 of the landing gear leg 501. The first torque link 512 is pivotally connected to a second torque link 511 and that second torque link 511 is connected to a wheel 502 of the landing gear leg 501 at an axle 503. Hence, rotation of the steering column 514 causes, through the torque links 511, 512, steering of the wheel 502.

The wheel 502 is supported by a wheel strut 541 which extends upwards through the landing gear leg 501 and is slidably mounted in the steering column 514. When in the "weight on wheel" situation of FIG. 1, the wheel 502 and wheel strut 541 slide upwards in relation to the landing gear leg 501 and steering column 514. When in the "weight off wheel" situation of FIG. 2, the wheel 502 and wheel strut 514 slide downwards in relation to the landing gear leg 501 and steering column 514.

The wheel strut 541 and steering column 514 are linked by a centreing cam arrangement (schematically shown as 542), which will be described in more detail in relation to FIG. 5.

The landing gear 500 also comprises a deployment mechanism 520 comprising a two-part drag strut, comprising an upper part 521 pivotally connected at pivot point 525b to a lower part 522. The upper end of the upper drag strut 521 is suspended from the fuselage 100 at a pivot point 525a behind the actuator pivot point 531. The lower end of the lower drag strut 522 is pivotally connected to an upper portion 505 of the landing gear leg 501 by pivot point 525c. The deployment mechanism 520 also comprises a two-part uplock, comprising a back part 524 and a front part 523. The front end of the front part 523 is pivotally connected to the drag strut near (or at the same point) as the pivot point 525b, at pivot point 526a. The back 524 and front 523 parts are pivotally connected to each other at pivot point 526b and the back end of back part 524 is pivotally attached to the upper portion 505 of the landing gear leg 501 by pivot point 526c, above pivot point 525c.

The "over-centre" uplock 523, 524 is used to lock the drag strut 521, 522 in the deployed position shown in FIGS. 1 and 2. A second actuator 527 is used to move the uplock past the "over-centre" point to allow the drag strut 521, 522 to move to stow the landing gear leg 501. The stowing of the landing gear leg 501 will be described in more detail, in relation to FIG. 3.

Figure 4A:
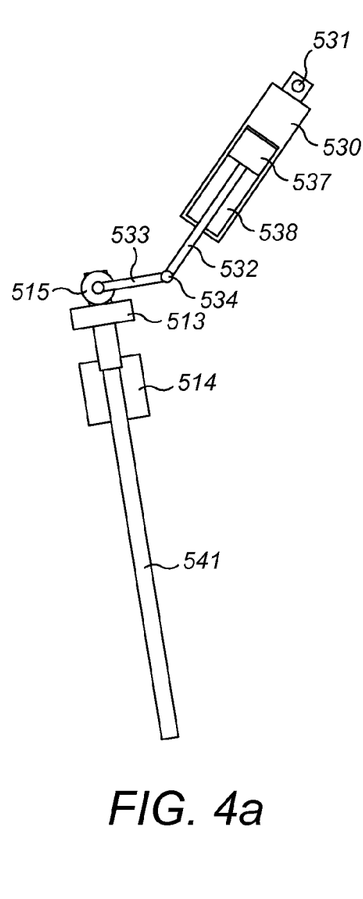
FIG. 4a shows a side view of part of the aircraft nose landing gear in a deployed "weight on wheel" situation, whilst the wheel is being steered left.

FIG. 4a shows a side view of part of the aircraft nose landing gear 500 in a deployed "weight on wheel" situation, whilst the wheel 502 is being steered left. Here, the actuator 530 can be seen more clearly. It comprises an actuator block 537 fixed on an actuator rod (the lever arm 532). The block 537 is contained within an actuator chamber 538 of the actuator 530. Hence, actuation of the actuator 530 moves the block 537 along the length of the actuator chamber 538 and thus effectively increases and decreases the length of the lever arm 532 extending from the actuator 530. In FIG. 4a, the actuator block 537 is located at the upper end of the actuator chamber 538 and hence a relatively large length of the lever arm 532 has been pulled within the actuator 530. This means that the effective (protruding) length of the lever arm 532 is small. This causes the lever arm 523 to pull on the crank arm 533 and, by pivot point 534, rotate the crank arm 533 in an anti-clockwise direction (as shown in FIG. 4*a*). This causes the bevel gear 515 to also rotate anti-clockwise. This then causes the steering disc 513 to rotate from left to right (as shown in FIG. 4*a*—i.e. anti-clockwise if viewed from the top of FIG. 4*a*) and cause the steering column 514 to also rotate in that direction. This then causes the torque links 511, 512 to rotate the wheel 502 so that it is steered in a left direction.

Figure 4B:
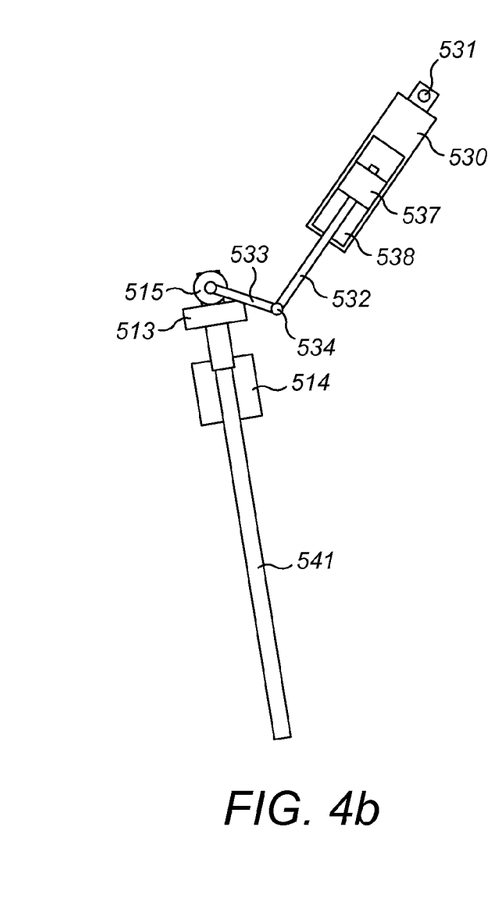
FIG. 4b shows a side view of part of the aircraft nose landing gear in a deployed "weight on wheel" situation, whilst the wheel is being steered centrally.

FIG. 4*b* shows a side view of part of the aircraft nose landing gear in a deployed "weight on wheel" situation, whilst the wheel is being steered centrally. Here, the actuator block 537 is located substantially centrally in the actuator chamber 538. The lever arm 532 has been effectively lengthened from FIG. 4*a*, and therefore crank arm 533 and bevel gear 515 have been pivoted clockwise. This rotates the steering disc 513 and steering column 514 to rotate towards the right and also causes the torque links 511, 512 to change the direction of the wheel 502 so that it is being steered in a central direction.

Figure 4C:
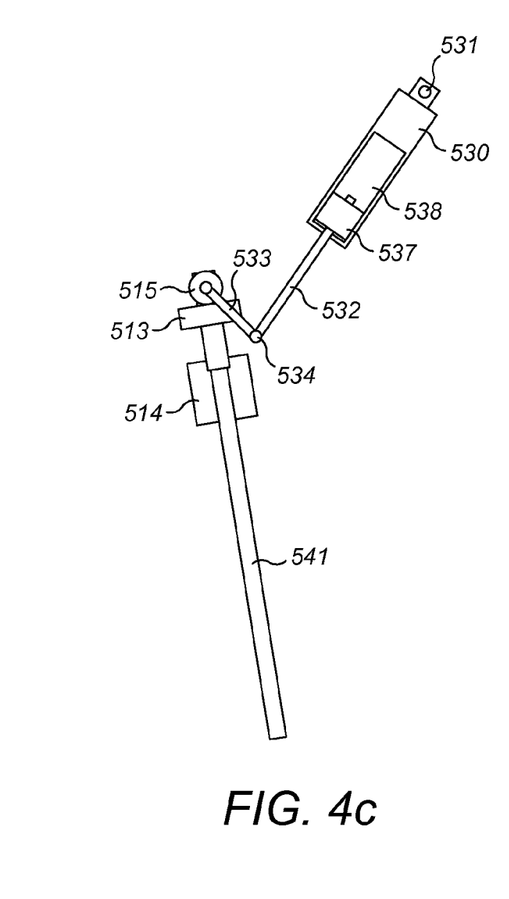
FIG. 4c shows a side view of part of the aircraft nose landing gear in a deployed "weight on wheel" situation, whilst the wheel is being steered right.

FIG. 4*c* shows a side view of part of the aircraft nose landing gear in a deployed "weight on wheel" situation, whilst the wheel is being steered right. Here, the actuator block 537 has been moved further down the actuator chamber 538 to a lower end of it. The lever arm 532 has been effectively lengthened further from FIG. 4*b*, and therefore crank arm 533 and bevel gear 515 have been pivoted further clockwise. This rotates the steering disc 513 and steering column 514 to rotate further to the right and also causes the torque links 511, 512 to change the direction of the wheel 502 so that it is being steered in a right direction.

Hence, the steering direction of the wheel 502 can be controlled by the actuator 530 when in the "weight on wheel" situation.

Figure 5:
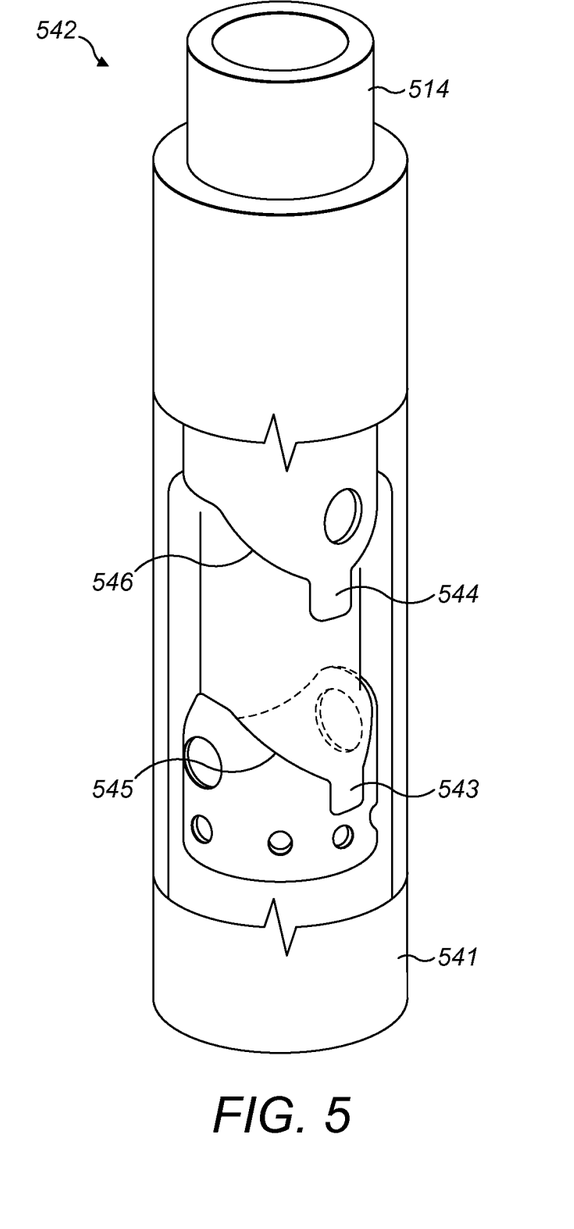
FIG. 5 shows a perspective view of a centreing cam arrangement of the aircraft nose landing gear in a "weight on wheel" situation.

FIG. 5 shows a perspective view of the centreing cam arrangement 542 of the aircraft nose landing gear 500 in a "weight on wheel" situation. The centreing cam arrangement is designed to do two things. Firstly, when there is a "weight off wheel" situation, the arrangement 542 ensures that the wheel 502 is orientated in a central orientation. This means that when the aircraft lands so that the wheel 502 controls the direction of the aircraft, the aircraft will not be steered off course by a wheel that is being orientated significantly left or right. This is achieved by the wheel strut 541 sliding downwards in relation to the steering column 514 when in a "weight off wheel" situation. This causes an internal downwardly facing notch 544 in the wheel strut 541 to fall into a corresponding internal upwardly facing groove 543 of the steering column 514. It is also noted that each of the notch and groove 544, 543 have corresponding tapered sides 546, 545 to effect rotation of the steering column 514 (and therefore wheel 502) as the notch 544 and groove 543 line up.

Secondly, also when there is a "weight off wheel" situation, the arrangement 542 (and in particular, the notch 544 in groove 543) rotationally fixes the steering column 514 in relation to the wheel strut 541 so that the steering column 514 cannot rotate. This means that the steering disc 513, bevel gear 515 and crank arm 533 also cannot rotate. Hence, when in a "weight off wheel" situation, lengthening and shortening of the lever arm 532 does not cause rotation of the crank arm 533, but instead causes the landing gear leg 501 to be pulled on by the lever arm 532 (via crank arm 533) so that it pivots about pivot point 506 to pivot the leg 501 in a stowing direction 702, as shown in FIG. 3.

Figure 3:
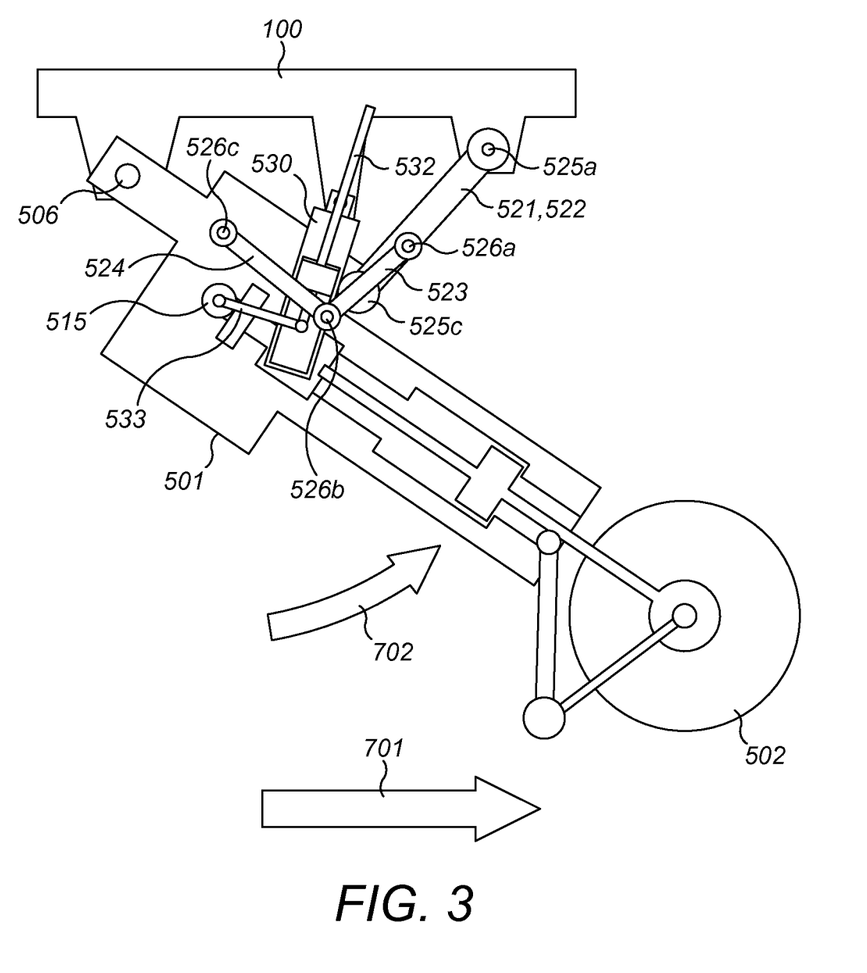
FIG. 3 shows a side view of the aircraft nose landing gear being moved into a stowed position.

In order for this to happen, the uplock actuator has to also be actuated to move the uplock "over-centre" so that the two parts 523, 524 of the uplock can collapse and allow the two parts of the drag strut 521, 522 to also collapse, as shown in FIG. 3.

Figure 6A:
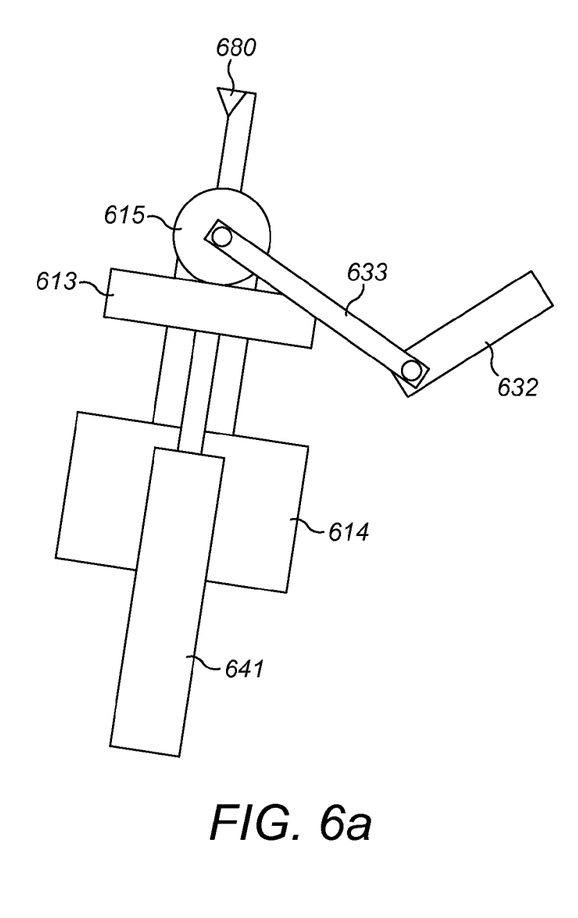
FIG. 6a shows a side view of part of an aircraft nose landing gear according to a second embodiment of the invention in a "weight off wheel" situation.
Figure 6B:
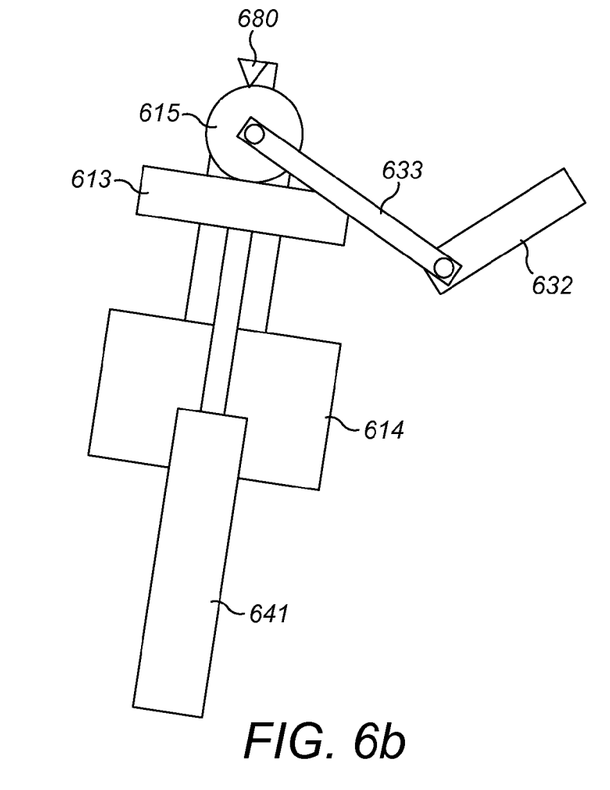
FIG. 6b shows a side view of part of the aircraft nose landing gear of FIG. 6a in a "weight on wheel" situation.

FIGS. 6*a* and 6*b* show side views of part of an aircraft nose landing gear 600 according to a second embodiment of the invention. Here, corresponding similar elements to the first embodiment (which are not described again for efficiency) are labelled with a preceding "6" instead of a "5". In this second embodiment, the wheel strut 641 is provided at an upper end with a downwardly pointing triangular member 680. When in the "weight on wheel" situation of FIG. 6*a*, the wheel strut 641 has been slid upwards in relation to the steering column 614 and hence triangular member 680 is above the bevel gear 615 and does not affect its ability to rotate. However, when in the "weight off wheel" situation of FIG. 6*b*, the wheel strut 641 has been slid downwards in relation to the steering column 614 and hence triangular member 680 is adjacent to the bevel gear 615. In fact, the point of the triangle lodges in between two projections (not shown) on the edge of the bevel gear 615 and prevent its rotation. Hence, the triangular member 680 is used to lock the bevel gear 615, steering disc 613 and steering column 614 and prevent their rotation when in the "weight off wheel" situation. This ensures that actuation of the actuator 630 would cause deployment/stowage of the landing gear 60, rather than steering of the wheel 602, in a similar way to the centreing cam arrangement 542 of the first embodiment.

Figure 7:
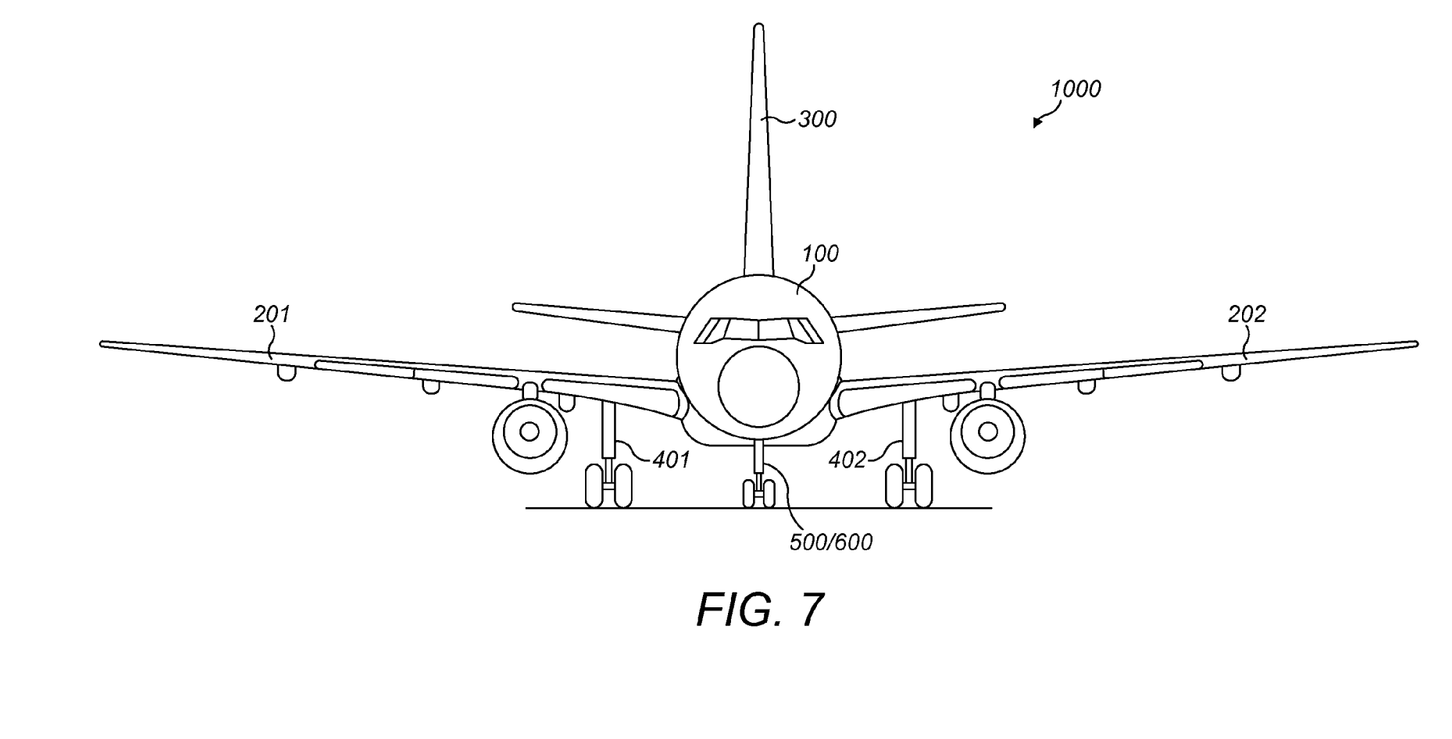
FIG. 7 shows a front view of an aircraft, including the aircraft nose landing gear of either the first or second embodiment.

FIG. 7 shows a front view of an aircraft 1000. The aircraft 1000 comprises a fuselage 100, two wings 210, 202 (each with one underwing engine) and a tailplane 300. Each of the wings 201, 202 is also provided with a main landing gear 401, 402. Finally, the aircraft 1000 is fitted with a nose landing gear according to either the first 500 or the second 600 embodiment.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The landing gear may be provided with two ways of rotationally fixing the steering column 514, 615; one way using a notch 544 of the centreing cam arrangement 542 of FIG. 5 and another way of using a triangular member 680 as shown in FIGS. 6*a* and 6*b*.

The aircraft landing gear 500, 600 may comprise more than one wheel 502, 602.

The aircraft landing gear 500, 600 may be a nose landing gear or any other landing gear.

Any aircraft may be used with this invention, and not just (a particularly sized) commercial passenger airliner, as shown in FIG. 7.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A landing gear assembly for an aircraft landing gear, the assembly comprising:
   a steering mechanism for steering at least one wheel of the landing gear,
   a deployment mechanism for moving a leg of the landing gear between a stowed position and a deployed position,
   an actuator arranged to actuate both the steering mechanism and the deployment mechanism, and
   wherein the actuator is the only actuator used for actuating both the steering mechanism and the deployment mechanism.

2. The landing gear assembly as claimed in claim 1, wherein the landing gear assembly further comprises a coupling mechanism for coupling the actuator to the steering mechanism and the deployment mechanism, wherein the coupling mechanism is arranged to couple the actuator to only one of the steering mechanism and the deployment mechanism at any one time.

3. A landing gear assembly for an aircraft landing gear, the assembly comprising:
   a steering mechanism for steering at least one wheel of the landing gear,
   a deployment mechanism for moving a leg of the landing gear between a stowed position and a deployed position,
   an actuator arranged to actuate both the steering mechanism and the deployment mechanism,
   wherein the actuator is the only actuator used for actuating both the steering mechanism and the deployment mechanism,
      wherein the landing gear assembly further comprises a coupling mechanism for coupling the actuator to the steering mechanism and the deployment mechanism, wherein the coupling mechanism is arranged to couple the actuator to only one of the steering mechanism and the deployment mechanism at any one time, and
      wherein the coupling mechanism is arranged to automatically couple the actuator to only one of the steering mechanism and the deployment mechanism at any one time.

4. The landing gear assembly as claimed in claim 2, wherein the coupling mechanism is arranged to couple the actuator to the steering mechanism when the wheel is in a "weight on wheel" situation and to couple the actuator to the deployment mechanism when the wheel is in a "weight off wheel" situation.

5. The landing gear assembly as claimed in claim 4, wherein the coupling mechanism comprises a locking mechanism, comprising a locking element moveable between a steering locked position, in which the steering mechanism is prevented from steering the wheel, and a steering unlocked position, in which the steering mechanism is able to steer the wheel, wherein when the wheel is in a "weight on wheel" situation the locking element is moved to the steering unlocked position and when the wheel is in a "weight off wheel" situation, the locking element is moved to the steering locked position.

6. The landing gear assembly as claimed in claim 5, wherein the locking element moves from the steering locked position to the steering unlocked position under the action of the wheel being moved from a dropped position to a raised position relative to the locking element when the wheel changes from a "weight off wheel" to a "weight on wheel" situation and moves from the steering unlocked position to the steering locked position under the action of the wheel being moved from the raised position to the dropped position relative to the locking element when the wheel changes from a "weight on wheel" to a "weight off wheel" situation.

7. The landing gear assembly as claimed in claim 6, wherein the coupling mechanism comprises a crank arm rotatable between first and second rotation positions by the actuator when the locking element is in the steering unlocked position, and prevented from rotating when the locking element is in the steering locked position.

8. The landing gear assembly as claimed in claim 7, wherein the crank arm is connected to the steering mechanism such that when the crank arm is in the first rotation position, the steering mechanism steers the wheel in a first direction and when the crank arm is in the second rotation position, the steering mechanism steers the wheel in a second different direction.

9. The landing gear assembly as claimed in claim 8, wherein the crank arm is connected to the steering mechanism by a bevel gear arrangement such that rotational movement of the crank arm is converted to rotational movement of the steering mechanism.

10. A landing gear assembly for an aircraft landing gear, the assembly comprising:
    a steering mechanism for steering at least one wheel of the landing gear,
    a deployment mechanism for moving a leg of the landing gear between a stowed position and a deployed position,
    an actuator arranged to actuate both the steering mechanism and the deployment mechanism,
    wherein the actuator is the only actuator used for actuating both the steering mechanism and the deployment mechanism,
       wherein the landing gear assembly further comprises a coupling mechanism for coupling the actuator to the steering mechanism and the deployment mechanism, wherein the coupling mechanism is arranged to couple the actuator to only one of the steering mechanism and the deployment mechanism at any one time,
    wherein the coupling mechanism is arranged to couple the actuator to the steering mechanism when the wheel is in a "weight on wheel" situation and to couple the actuator to the deployment mechanism when the wheel is in a "weight off wheel" situation,
    wherein the coupling mechanism comprises a locking mechanism, comprising a locking element moveable between a steering locked position, in which the steering mechanism is prevented from steering the wheel, and a steering unlocked position, in which the steering mechanism is able to steer the wheel, wherein when the wheel is in a "weight on wheel" situation the locking element is moved to the steering unlocked position and when the wheel is in a "weight off wheel" situation, the locking element is moved to the steering locked position,
    wherein the locking element moves from the steering locked position to the steering unlocked position under the action of the wheel being moved from a dropped position to a raised position relative to the locking element when the wheel changes from a "weight off wheel" to a "weight on wheel" situation and moves from the steering unlocked position to the steering locked position under the action of the wheel being moved from the raised position to the dropped position relative to the locking element when the wheel changes from a "weight on wheel" to a "weight off wheel" situation, wherein the coupling mechanism comprises a crank arm rotatable between first and second rotation positions by the actuator when the locking element is in the steering unlocked position, and prevented from rotating when the locking element is in the steering locked position, wherein the crank arm is connected to the steering mechanism such that when the crank arm is in the first rotation position, the steering mechanism steers the wheel in a first direction and when the crank arm is in the second rotation position, the steering mechanism steers the wheel in a second different direction, wherein the crank arm is connected to the steering mechanism by a bevel gear arrangement such that rotational movement of the crank arm is converted to rotational movement of the steering mechanism, and wherein, when in the steering locked position, the locking element acts on the bevel gear arrangement to prevent its rotation.

11. The landing gear assembly as claimed in claim 7, wherein, when in the steering locked position, the locking element acts on the steering mechanism to prevent its rotation.

12. The landing gear assembly as claimed in claim 11, wherein the locking element is part of a centring arrangement for centring the steering mechanism, such that the wheel is steered in a central direction when the wheel is in a "weight off wheel" situation.

13. The landing gear assembly as claimed in claim 7, wherein the coupling mechanism comprises a lever arm connected at a first end of the lever arm to the actuator and moveable by the actuator between extended and retracted positions.

14. The landing gear assembly as claimed in claim 13, wherein the lever arm is rotatably connected at a second end of the lever arm to the crank arm such that when the lever arm is caused to extend and retract by the actuator, the crank arm is caused to rotate by the lever arm.

15. The landing gear assembly as claimed in claim 14, wherein, when the crank arm is prevented from rotating by the locking element in the steering locked position, movement by the actuator of the lever arm between extended and retracted positions instead causes the landing gear leg to move between the deployed and stowed positions.

16. The landing gear assembly as claimed in claim 1, wherein the steering mechanism comprises a steering collar connected to the actuator and one or more torque links connected to the wheel.

17. The landing gear assembly as claimed in claim 1, wherein the deployment mechanism comprises a number of moveable links, including an over-center uplock, connected between the actuator and the landing gear leg.

18. The landing gear assembly as claimed in claim 17, wherein the deployment mechanism further comprises a second actuator for moving the over-center uplock.

19. The aircraft landing gear comprising the landing gear arrangement of claim 1.

20. The aircraft comprising the aircraft landing gear or the landing gear arrangement of claim 1.

21. The method of operating an aircraft landing gear comprising the step of providing a landing gear arrangement, aircraft landing gear or aircraft of claim 1.

* * * * *